(12) United States Patent
Golini et al.

(10) Patent No.: US 8,557,886 B2
(45) Date of Patent: Oct. 15, 2013

(54) STORAGE-STABLE POLYOL COMPOSITIONS FOR PRODUCING RIGID POLYISOCYANURATE FOAM

(75) Inventors: Paolo Golini, Reggio Emilia (IT); Francesca Pignagnoli, Reggio Emilia (IT)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/255,133

(22) PCT Filed: Mar. 16, 2010

(86) PCT No.: PCT/US2010/027385
§ 371 (c)(1), (2), (4) Date: Sep. 7, 2011

(87) PCT Pub. No.: WO2010/114695
PCT Pub. Date: Oct. 7, 2010

(65) Prior Publication Data
US 2012/0010309 A1    Jan. 12, 2012

Related U.S. Application Data

(60) Provisional application No. 61/165,626, filed on Apr. 1, 2009.

(51) Int. Cl.
*C08J 9/00* (2006.01)
*C08J 9/14* (2006.01)
*C08G 18/00* (2006.01)

(52) U.S. Cl.
USPC ............. 521/98; 521/155; 521/170; 521/172; 521/174

(58) Field of Classification Search
USPC .................................. 521/172, 98, 170, 174
See application file for complete search history.

(56) References Cited

U.S. PATENT DOCUMENTS

| | | |
|---|---|---|
| 4,046,721 A | 9/1977 | Austin et al. |
| 5,114,755 A | 5/1992 | Canaday et al. |
| 6,274,642 B1 | 8/2001 | Rotermund et al. |
| 6,359,022 B1 | 3/2002 | Hickey et al. |
| 6,486,224 B2 * | 11/2002 | Lin et al. ........................ 521/159 |
| 2001/0003758 A1 | 6/2001 | Bonapersona et al. |
| 2005/0124711 A1 | 6/2005 | Cameron et al. |
| 2006/0047011 A1 | 3/2006 | Kusan-Bindels et al. |
| 2006/0052467 A1 * | 3/2006 | Pignagnoli et al. ........... 521/130 |
| 2012/0009414 A1 | 1/2012 | Golini |

FOREIGN PATENT DOCUMENTS

EP    1435366 A1    7/2004

OTHER PUBLICATIONS

PCT/US2010/027385 International Preliminary Report on Patentability.
PCT/US2010/027385 International Search Report.
PCT/US2010/027385 Written Opinion.

* cited by examiner

*Primary Examiner* — Melissa Rioja

(57) ABSTRACT

Disclosed is a polyol composition comprising an aliphatic polyester polyol having a hydroxyl value of less than about 100 and prepared by the reaction of at least a polycarboxylic acid with a polyhydroxy compound; an aromatic polyester polyol; a Novolac-type polyether polyol; and a hydrofluorocarbon blowing agent; that may be storage-stable for at least 60 days. This composition may be reacted with a polyisocyanate at an isocyanate index of from about 2.5 to about 4 to form a rigid poly-isocyanurate foam. The foam shows improved cohesion in general and also improved adhesion and a reduced incidence of voids when applied to a metal substrate.

19 Claims, No Drawings

STORAGE-STABLE POLYOL COMPOSITIONS FOR PRODUCING RIGID POLYISOCYANURATE FOAM

BACKGROUND

1. Field of the Invention

This invention relates to polyisocyanurate foams. More specifically, it relates to rigid polyisocyanurate foams prepared from relatively storage-stable polyol compositions.

2. Background of the Art

Polyisocyanurate foams are widely used as insulating materials in the construction industry. Typically these foams are closed-cell, rigid foams containing a low-conductivity gas, such as a hydrochlorofluorocarbon (HCFC), in the cells. The foaming compositions, being liquids, may be used in pour-in-place applications; sprayed applications; and to form rigid foam boards. The boards, in particular, often include a facing, such as a metal foil, to which the foam adheres.

Unfortunately, polyisocyanurate foams, typically formed from polyester polyols and methylene diphenyl diisocyanate (MDI) at an MDI/polyol ratio over 250, may suffer from drawbacks. One frequent problem is that the foams may exhibit poor cohesion and/or adhesion (tensile bond strength) when faced with metals such as foils and steel. They may also suffer from formation of undesirable voids at the foam/metal interface.

For many polyisocyanurates, the polyester polyol employed is an aromatic-based structure. While such polyisocyanurate foams have many uses, it has been found that inclusion of at least some aliphatic polyester polyol may offer benefits. For example, US 2006/0047011 A1 discloses that polyisocyanurate foams prepared from aliphatic polyester polyols may exhibit improved flame resistance, lower thermal conductivity, reduced brittleness and improved surface adhesion. Low viscosity enables potential use in spray foams. The aliphatic polyols used therein are based on a combination of adipic, glutaric, succinic and nitric acids with water, esterified with ethylene glycol. These polyols have hydroxyl (OH) numbers of greater than 200 and viscosities in the range of 2,000 mPa*s.

In another example, a combination of aliphatic and aromatic polyester polyols is described in US 2001/0003758 as useful for preparing rigid isocyanurate-modified polyurethane foams. The foams have an isocyanate index ranging from 80 to 380.

Notwithstanding the above-described art, there is still a need for polyiso-cyanurate foams exhibiting improvements in foam cohesion and in adhesion to steel facings. These and other features may be found in the present invention.

SUMMARY OF THE INVENTION

In one aspect the present invention provides a storage-stable polyol composition comprising from about 1 to about 20 percent by weight of an aliphatic polyester polyol having a hydroxyl number of less than about 100, wherein the aliphatic polyester polyol is prepared by the reaction of at least a polycarboxylic acid with a polyhydroxy compound; from about 1 to about 60 percent by weight of an aromatic polyester polyol; from about 1 to about 60 percent by weight of a Novolac-type polyether polyol; and from about 1 to about 20 percent by weight of a hydrofluorocarbon blowing agent; wherein the polyol composition does not exhibit phase separation, as determined by unenhanced visual inspection, for a period of at least 60 days under ambient conditions.

In another aspect the invention provides a formulation for preparing a polyisocyanurate foam comprising a polyisocyanate and a polyol composition comprising (a) from about 1 to about 20 percent by weight of an aliphatic polyester polyol having a hydroxyl number of less than about 100, wherein the aliphatic polyester polyol is prepared by the reaction of at least a polycarboxylic acid with a polyhydroxy compound; (b) from about 1 to about 60 percent by weight of an aromatic polyester polyol; (c) from about 1 to about 60 percent by weight of a Novolac-type polyether polyol; and (d) from about 1 to about 20 percent by weight of a hydrofluorocarbon blowing agent; the polyol composition being such that it does not exhibit phase separation, as determined by unenhanced visual inspection, for a period of at least 60 days under ambient conditions.

In yet another aspect the present invention provides a method of preparing a polyisocyanurate foam comprising contacting under foam-forming conditions (a) a polyisocyanate; and (b) a polyol composition comprising from about 1 to about 20 percent by weight of an aliphatic polyester polyol having a hydroxyl number of less than about 100, wherein the aliphatic polyester polyol is prepared by the reaction of at least a polycarboxylic acid with a polyhydroxy compound; from about 1 to about 60 percent by weight of an aromatic polyester polyol; from about 1 to about 60 percent by weight of a Novolac-type polyether polyol; and from about 1 to about 20 percent by weight of a hydrofluorocarbon blowing agent; the polyol composition being such that it does not exhibit phase separation, as determined by unenhanced visual inspection, for a period of at least 60 days under ambient conditions; at an isocyanate index ranging from about 2.5 to about 4; to form a rigid polyisocyanurate foam.

DETAILED DESCRIPTION OF THE EMBODIMENTS

The invention, which includes both a polyol composition showing unexpected storage stability and a method of making a polyisocyanurate foam using the novel polyol composition, offers both process and property improvements that are advantageous in the polyisocyanurate industry. As used herein, the term "polyisocyanurate" includes both polyisocyanurate foams and urethane-modified polyisocyanurate (PU-PIR) foams. The term "storage-stable" is defined herein as showing no phase separation, as determined by unenhanced visual inspection, for a period of at least about 60 days under ambient conditions. These improvements are attributable to a polyol composition containing at least three specific components, as described hereinbelow.

1) Aliphatic Polyester Polyol

The first component is an aliphatic polyester polyol. This aliphatic polyester polyol may be produced in any effective manner known to those skilled in the art. In one method, suitable aliphatic polyester polyols may be produced by means of a condensation reaction between a polycarboxylic acid and a polyhydroxy compound. Such polycarboxylic acids may have two or more carboxylic acid groups or an equivalent number of anhydride groups, on the basis that one anhydride group is equivalent to two acid groups, and are well known in the art. Preferably the polycarboxylic acid contains two carboxylic acid groups. Examples of suitable polycarboxylic acids include aliphatic dicarboxylic acids having 2 to 12, preferably 2 to 8, carbon atoms in the alkylene radical. These acids include, for example, aliphatic dicarboxylic acids such as adipic acid, glutaric acid, succinic acid, pimelic acid, suberic acid, azelaic acid, sebacic acid, undecanedioic acid, dodecanedioic acid, decanedicarboxylic acid, and hexanedioic acid; cycloaliphatic acids such as hexahydrophthalic acid and 1,3- and 1,4-cyclohexane dicarboxylic acid; and 1,3- and 1,4-unsaturated alkane dioic acids such as fumaric and maleic acids. The anhydrides of the aforementioned polybasic acids, such as maleic anhydride or phthalic anhydride, may also be used. A combination of two or more of the polybasic acids may also be used. In one embodiment, it is preferred to use adipic acid, glutaric acid, succinic acid, or a combination thereof. Such combinations of acids are commercially available and generally comprise from 19 to 26 weight percent adipic acid, from 45 to 52 weight percent glutaric acid, and from 16 to 24 weight percent succinic acid.

In another embodiment, a suitable aliphatic polyester polyol may be prepared from the condensation reaction of a fatty acid and a polycarboxylic acid with a polyhydroxy compound. Suitable dimer fatty acids, in non-limiting embodiments, are known in the art (see for example, publication US 2005/0124711, the disclosure of which is incorporated herein by reference in its entirety), and in general are dimerization products of mono- or polyunsaturated fatty acids and/or esters thereof. Such dimer fatty acids are dimers of $C_{10}$ to $C_{30}$, more preferably $C_{12}$ to $C_{24}$, and most preferably $C_{14}$ to $C_{22}$ alkyl chains. Suitable fatty acids for producing the polyesters of the present invention include, for example, dimerization products of oleic acid, linoleic acid, linolenic acid, palmitoleic acid and elaidic acid. The dimerization products of the unsaturated fatty acid mixtures obtained in the hydrolysis of natural fats and oils, e.g. sunflower oil, soybean oil, olive oil, rapeseed oil, cottonseed oil and tall oil, may also be used.

In addition to the dimer fatty acids, dimerization usually results in varying amounts of oligomeric fatty acids, such as trimers, and residues of monomeric fatty acids, or esters thereof, being present. Commercially available products, such as those available from Uniqema, generally have a dimer content of from greater than 60 percent to greater than 95 percent. The trimer content is generally less than 40 percent and is preferably in the range of from 2 to 25 percent for use in the present invention. Other non-dimer fatty acids may also be useful.

Examples of suitable polyhydroxy compounds are multivalent alcohols, and in some embodiments dials, including but not limited to ethylene glycol, diethylene glycol, propylene glycol, dipropylene glycol, 1,2- and 1,3-propanediol, 1,10-decanediol, glycerine, trimethylolpropane, 1,4-butanediol, 1,5-pentanediol, 1,6-hexanediol and 1,3- and 1,4-cyclohexanedimethanol, ethanediol, tripropylene glycol, tetraethylene glycol, tetrapropylene glycol, tetramethylene glycol, and combinations thereof. If trifunctional or higher alcohols are used, their amounts may generally be selected such that the functionality of a given blend is a maximum of 2.8, preferably from 2 to 2.3. In one embodiment, ethylene glycol, diethylene glycol, butanediol, or a combination thereof may be particularly useful. In general, the lower alkylene and alkoxyalkylene compounds, defined as having from 2 to 12 carbon atoms, are preferred as starting materials.

The aliphatic polyester polyol preferably has a molecular weight number average in the range from 1,000 to 5,000, more preferably 1,700 to 3,000, particularly from 1,800 to 2,500, and more preferably from 1,900 to 2,200. Its hydroxyl number is preferably from about 10 to about 100, preferably from about 30 to about 80, and more preferably from about 40 to about 70 mg KOH/g. In addition, it may have an acid value of less than about 2, preferably less than about 1.5, and more preferably less than about 1.3.

Processes for the production of aliphatic polyester polyols are well known in the art. One method to prepare these aliphatic polyester polyols is to polycondense a fatty acid dimer, or ester thereof, and a (non-dimer) polycarboxylic acid, both of which are essentially aliphatic compounds, with a selected polyhydroxy compound. To remove volatile byproducts, the aliphatic polyester polyols may then be subjected to distillation under reduced pressure, followed by stripping with an inert gas, vacuum, or other known separation method. However, it is possible that some of the starting materials may include aromatic groups. In that case, the aromatic content of the final aliphatic polyester polyol (expressed as weight percent of groups containing at least one aromatic ring per molecule) is below about 50 percent, i.e., this polyester polyol is predominantly, though not necessarily exclusively, aliphatic in nature.

Resulting suitable aliphatic polyester polyols may be, in some embodiments, cycloaliphatic or heterocyclic aliphatic in nature and may also include aliphatic polyester polyols of lactones, for example, epsilon-caprolactone or a hydroxycarboxylic acid, such as, for example, omega-hydroxycaproic acid.

2) Aromatic Polyester Polyol

The second component is an aromatic polyester polyol. As used herein, "aromatic" refers to organic compounds having at least one conjugated ring of alternate single and double bonds, which imparts an overall stability to the compounds. The term "polyester polyol" as used herein includes any minor amounts of unreacted polyol remaining after the preparation of the polyester polyol and/or unesterified polyol (for example, glycol) added after the preparation of the polyester polyol. While the aromatic polyester polyol may be prepared from substantially pure reactant materials, more complex starting materials, such as polyethylene terephthalate, may be advantageous. Other residues are dimethyl terephthalate (DMT) process residues, which are waste or scrap residues from the manufacture of DMT.

The aromatic polyester polyol may optionally contain, for example, halogen atoms and/or may be unsaturated, and may generally be prepared from the same selection of starting materials as described hereinabove, but at least one of the polyol or the polycarboxylic acid, preferably the acid, is an aromatic compound having an aromatic ring content (expressed as weight percent of groups containing at least one aromatic ring per molecule) that is at least about 50 percent by weight, based on the total compound weight, and preferably greater than about 50 percent by weight, i.e., it is predominantly aromatic in nature. Polyester polyols having an acid component that advantageously comprises at least about 30 percent by weight of phthalic acid residues, or residues of isomers thereof, are particularly useful. Preferably the aromatic ring content of the aromatic polyester polyol is from about 70 to about 90 percent by weight, based on the total compound weight. Preferred aromatic polyester polyols are the crude polyester polyols obtained by the transesterification of crude reaction residues or scrap polyester resins.

3) Novolac-Type Polyether Polyol

The third component is a Novolac-type polyether polyol. Novolac-type polyether polyols are the alkoxylation products of a phenol-formaldehyde resin, which is formed by the elimination reaction of phenol with formaldehyde in the presence of an acid catalyst, such as glacial acetic acid, followed by concentrated hydrochloric acid. Usually a small amount of the acid catalyst or catalysts is/are added to a miscible phenol, such as p-toluenesulfonic acid, followed by formaldehyde. The formaldehyde will react between two phenols to form a methylene bridge, creating a dimer by electrophilic aromatic substitution between the ortho and para positions of phenol and the protonated formaldehyde. This dimer is bisphenol F. Another example is bisphenol A, which is the condensation product of acetone with two phenols. As concentration of dimers increase, trimers, tetramers and higher oligomers may also form. However, because the molar ratio of formaldehyde to phenol is controlled at somewhat less than 1, polymerization is not completed. Thus, the Novolac may then be alkoxylated to build molecular weight to a desired level, desirably from about 300 to about 1500, and in certain non-limiting embodiments, from about 400 to about 1000.

Phenols which may be used to prepare the Novolac initiator include: o-, m-, or p-cresols, ethylphenol, nonylphenol, p-phenylphenol, 2,2-bis(4-hydroxyphenol) propane, beta-naphthol, beta-hydroxyanthracene, p-chlorophenol, o-bromophenol, 2,6-dichloro-phenol, p-nitrophenol, 4-nitro-6-phenylphenol, 2-nitro-4-methylphenol, 3,5-dimethylphenol, p-isopropylphenol, 2-bromo-4-cyclohexylphenol, 4-t-butylphenol, 2-methyl-4-bromophenol, 2-(2-hydroxypropyl) phenol, 2-(4-hydroxyphenol)ethanol, 2-carbethoxyphenol, 4-chloro-methylphenol, and mixtures thereof. It is especially preferred that the phenols used to prepare the Novolac-type polyether polyols be unsubstituted.

Suitable Novolac-type polyether polyols may be produced, for example, by reacting a condensate adduct of phenol and formaldehyde with one or more alkylene oxides including ethylene oxide, propylene oxide, and butylene oxide. Such polyols, sometimes referred to as Novolac-initiated polyols, are known to those skilled in the art, and may be obtained by methods such as are disclosed in, for example, U.S. Pat. Nos. 2,838,473; 2,938,884; 3,470,118; 3,686,101; and 4,046,721; the disclosures of which are incorporated herein by reference in their entireties. Typically, Novolac starting materials are prepared by reacting a phenol (for example, a cresol) with from about 0.8 to about 1.5 moles of formaldehyde per mole of the phenol in the presence of an acidic catalyst to form a polynuclear condensation product containing from 2.1 to 12, preferably from 2.2 to 6, and more preferably from 3 to 5 phenol units per molecule. The Novolac resin is then reacted with an alkylene oxide such as ethylene oxide, propylene oxide, butylene oxide, or isobutylene oxide to form an oxyalkylated product containing a plurality of hydroxyl groups. For the purpose of the present invention, preferred Novolac polyols are those having an average of from 3 to 6 hydroxyl moieties per molecule and an average hydroxyl equivalent weight of from about 100 to about 500, preferably from about 100 to about 300.

The Blowing Agent(s)

Also included in the polyol composition is a hydrofluorocarbon blowing agent. This hydrofluorocarbon blowing agent is selected such that, when combined in a desired amount with the selected polyols, including but not necessarily limited to the polyols listed hereinabove as necessary to the present invention, the combination is storage-stable as defined hereinabove. Examples of hydrofluorocarbon blowing agents include, but are not necessarily limited to, HCFC-142b (1-chloro-1,1-difluoroethane), HCFC-22 (chlorodifluoromethane), HFC-245fa (1,1,1,3,3-pentafluoropropane), HFC-365mfc (1,1,1,3,3-penta-fluorobutane), HFC-227ea (1,1,1,2,3,3,3-heptafluoropropane), HFC-134a (1,1,1,2-tetrafluoroethane), combinations thereof, and the like.

In some embodiments of the invention other blowing agents may also be included in the polyol composition, provided that such do not negatively affect the storage stability of the polyol composition including the hydrofluorocarbon blowing agent. For example, hydrocarbon or non-fluorine-containing hydrohalocarbon blowing agents may be used, and in some instances may serve to reduce, or further reduce, viscosity, and thereby enhance sprayability. In certain particular non-limiting embodiments, one or more optional additional blowing agents may be selected from, for example, butane, isobutane, 2,3-dimethylbutane, n- and i-pentane isomers, hexane isomers, heptane isomers and cycloalkanes including cyclopentane, cyclohexane, cycloheptane, and combinations thereof. These hydrocarbons and/or non-fluorine-containing hydrohalocarbons are preferably used in an amount such that the total blowing agent, including the hydrofluorocarbon, is no more than about 15 parts, more desirably no more than about 10 parts, based on 100 parts of the total polyol composition.

An optional chemical blowing agent that may be selected is formic acid or another carboxylic acid. The formic acid may be used in an amount of from about 0.5 to about 8 parts per 100 parts by weight of the polyol composition. In certain non-limiting embodiments, the formic acid is present in an amount from about 0.5 parts and more preferably from about 1 part, up to about 6 parts and more preferably to about 3.5 parts by weight. While formic acid is the carboxylic acid of preference, it is also contemplated that minor amounts of other aliphatic mono- and polycarboxylic acids may be employed, such as those disclosed in U.S. Pat. No. 5,143,945, which is incorporated herein by reference in its entirety, and including isobutyric acid, ethylbutyric acid, ethylhexanoic acid, and combinations thereof.

In addition to, or in lieu of, the formic acid or other carboxylic acid blowing agent, water may also be optionally selected as a chemical blowing agent. The water is, in some non-limiting embodiments, present in an amount of from about 0.5 to about 10 parts, and preferably from about 1 to about 6 parts, per 100 parts by weight of the polyol composition. When preparing a polyisocyanurate foam, in order to facilitate and give desirable processing characteristics, it is advantageous not to exceed 2 parts of water, preferably not more than 1.5 parts of water, and more preferably not more than 0.75 parts of water, per 100 parts of polyol composition. Omission of water is desirable in some non-limiting embodiments.

Finally, carbamates, which release carbon dioxide during the foaming process, and their adducts may also be used advantageously as an optional, additional chemical blowing agent. Such are discussed in greater detail in, for example, U.S. Pat. Nos. 5,789,451 and 6,316,662, and EP 1 097 954, which are incorporated herein by reference in their entireties.

Proportions in Polyol Composition

The four minimum required components of the polyol portion of the polyisocyanurate formulation are, in certain non-limiting embodiments, present in specific proportion ranges in order to improve their storage stability after they are combined. A maximum of about 20 percent by weight of the aliphatic polyester polyol is preferred, but the total amount of the aliphatic polyester polyol may range from about 1 to about 20 percent by weight. While the aromatic polyester polyol and Novolac-type polyether polyol may each range from about 1 to about 60 percent by weight, in preferred embodiments the Novolac-type polyether polyol may range from about 20 to about 50 weight percent. Combinations of more than one of each type of polyol may also be selected, provided their combined percentages comply with the stated maximums. The weight percent ratio of aromatic polyester polyol(s) to aliphatic polyester polyol(s) is preferably from about 90:10 to about 20:80, more preferably from about 80:20 to about 30:70, and most preferably from about 80:20 to about 40:60. The hydrofluorocarbon blowing agent is desirably present in an amount from about 2 to about 15 parts, based on 100 parts of polyol composition, and more desirably in an amount from about 4 to about 10 parts on the same basis.

As already noted hereinabove, the term "storage-stable" refers to a material which, upon unenhanced visual inspection, does not exhibit phase separation for a period of at least 60 days under ambient conditions. As used herein, the term "unenhanced" precludes microscopic or other viewing enhancement that offers significantly greater acuity beyond that obtained by the natural human eye, with or without conventional optical corrective devices such as glasses and contact lenses. Thus, in the present invention a storage-stable polyol composition is one that includes at least the four required components (aliphatic polyester polyol, aromatic polyester polyol, Novolac-initiated polyether polyol, and hydrofluorocarbon blowing agent) and that does not exhibit phase separation, as determined by unenhanced visual inspection, for a period of at last 60 days. "Phase separation," as the term is used herein, may be exhibited as actual separation into layers, or simply as a cloudy or hazy appearance of the composition, under ambient conditions. It will be understood that proportions of components, as well as selection of components, will affect the overall storage-stability of the composition as a whole. As used herein, the term "polyol composition" is used to refer to the combination of polyol starting materials, both required and, in some cases, additional optional polyol starting materials, as well as the hydrofluorocarbon blowing agent and any additional blowing agents.

The Isocyanate Component

In order to prepare a polyisocyanurate foam, it is necessary to react the polyol composition with a polyisocyanate component under appropriate foam-forming conditions. The polyisocyanate component is referred to in the United States as the "A-component" (in Europe, as the "B-component"). Selection of the A-component may be made from a wide variety of polyisocyanates, including but not limited to those that are well known to those skilled in the art. For example, organic polyisocyanates, modified polyisocyanates, isocyanate-based prepolymers, and mixtures thereof may be employed. These may further include aliphatic and cycloaliphatic isocyanates, and in particular aromatic and, more particularly, multifunctional aromatic isocyanates. Also particularly preferred are polyphenyl polymethylene polyisocyanates (PMDI).

Other polyisocyanates useful in the present invention include 2,4- and 2,6-toluenediisocyanate and the corresponding isomeric mixtures; 4,4'-, 2,4'- and 2,2'-diphenyl-methane-diisocyanate and the corresponding isomeric mixtures; mixtures of 4,4'-, 2,4'- and 2,2'-diphenyl-methanediisocyanates and polyphenyl polymethylene polyisocyanates (PMDI); and mixtures of PMDI and toluene diisocyanates. Also useful herein are aliphatic and cycloaliphatic isocyanate compounds, such as 1,6-hexamethylenediisocyanate; 1-isocyanato-3,5,5-trimethyl-1,3-isocyaantomethylcyclo-hexane; 2,4- and 2,6-hexahydrotoluene-diisocyanate and their corresponding isomeric mixtures; and 4,4'-, 2,2'- and 2,4'-dicyclo-hexyl-methanediisocyanate and their corresponding isomeric mixtures. Also useful in the present invention is 1,3-tetramethylene xylene diisocyanate.

Also advantageously used for the A-component are the so-called modified multifunctional isocyanates, that is, products which are obtained through chemical reactions of the above diisocyanates and/or polyisocyanates. Exemplary are polyisocyanates containing esters, ureas, biurets, allophanates and, preferably, carbodiimides and/or uretonomine, and isocyanurate and/or urethane group-containing diisocyanates or polyisocyanates. Liquid polyisocyanates containing carbodiimide groups, uretonomine groups and/or isocyanurate rings, having isocyanate groups (NCO) contents of from 120 to 40 weight percent, more preferably from 20 to 35 weight percent, can also be used. These include, for example, polyisocyanates based on 4,4'- 2,4'- and/or 2,2'-diphenylmethane diisocyanate and the corresponding isomeric mixtures, 2,4- and/or 2,6-toluenediisocyanate and the corresponding isomeric mixtures; mixtures of diphenylmethane diisocyanates and PMDI; and mixtures of toluenediisocyanates and PMDI and/or diphenylmethane diisocyanates.

Suitable prepolymers for use as the polyisocyanate component of the formulations of the present invention are prepolymers having NCO contents of from 2 to 40 weight percent, more preferably from 4 to 30 weight percent. These prepolymers are prepared by reaction of the di- and/or polyisocyanates with materials including lower molecular weight diols and triols, but also can be prepared with multivalent active hydrogen compounds such as di- and tri-amines and di- and tri-thiols. Individual examples include aromatic polyisocyanates containing urethane groups, preferably having NCO contents of from 5 to 40 weight percent, more preferably 20 to 35 weight percent, obtained by reaction of diisocyanates and/or polyisocyanates with, for example, polyols such as lower molecular weight diols, triols, oxyalkylene glycols, dioxyalkylene glycols, or polyoxyalkylene glycols having molecular weights up to about 800. These polyols can be employed individually or in mixtures as di- and/or polyoxyalkylene glycols. For example, diethylene glycols, dipropylene glycols, polyoxyethylene glycols, ethylene glycols, propylene glycols, butylene glycols, polyoxypropylene glycols and polyoxypropylene polyoxyethylene glycols can be used. Polyester polyols can also be used, as well as alkyl diols such as butane diol. Other diols also useful include bishydroxyethyl- or bishydroxypropyl-bisphenol A, cyclohexane dimethanol, and bishydroxyethyl hydroquinone.

Useful as the polyisocyanate component of prepolymer formulations that may be employed in the present invention are: (i) polyisocyanates having an NCO content of from 8 to 40 weight percent containing carbodiimide groups and/or urethane groups, from 4,4'-diphenylmethane diisocyanate or a mixture of 4,4'- and 2,4'-diphenylmethane diisocyanates; (ii) prepolymers containing NCO groups, having an NCO content of from 2 to 35 weight percent, based on the weight of the prepolymer, prepared by the reaction of polyols having a functionality of preferably from 1.75 to 4 and a molecular weight of from 800 to 15,000 with either 4,4'-diphenylmethane diisocyanate, a mixture of 4,4'- and 2,4'-diphenylmethane diisocyuanate, or a mixture of (i) and (ii); and (iii) 2,4' and 2,6-toluene-diisocyanate and their corresponding isomeric mixtures.

PMDI in any of its forms is the most preferred polyisocyanate for use with the present invention. When used, it preferably has an equivalent weight between 125 and 300, more preferably from 130 to 175, and an average functionality of greater than about 1.5. More preferred is an average functionality of from 1.75 to 3.5. The viscosity of the polyisocyanate component is preferably from 25 to 5,000 centipoise (cP) (0.025 to about 5 Pa*s), but values from 100 to 1,000 cP at 25° C. (0.1 to 1 Pa*s) are preferred for ease of processing. Similar viscosities are preferred where alternative polyisocyanate components are selected. Still, preferably the polyisocyanate component of the formulations of the present invention is selected from the group consisting of MDI, PMDI, an MDI prepolymer, a PMDI prepolymer, a modified MDI, and mixtures thereof.

In proportion it is desirable that the ratio of the A-component to the B-component (polyisocyanate to polyol composition) ranges from about 2.5 to about 4; in some non-limiting embodiments, the isocyanate index is desirably from about 2.8 to about 3.5.

Optional Formulation Components

Other polyols may also be included in the invention, in addition to the three denoted as necessary to the invention, and, if included, are considered to be part of the formulation's B-component. While these additional materials are typically included as part of the B-component during the formulating process, such are treated here separately because they are considered to be optional. Such may include one or more other polyether or polyester polyols of the kind typically employed in processes to make polyurethane and/or polyisocyanurate foams. Other compounds having at least two isocyanate-reactive hydrogen atoms may also be present, for example, polythioether polyols, polyester amides and polyacetals containing hydroxyl groups, aliphatic polycarbonates containing hydroxyl groups, amine terminated polyoxyalkylene polyethers, and preferably, polyester polyols, polyoxyalkylene polyether polyols, and graft dispersion polyols. Mixtures of two or more of the aforesaid materials may also be employed.

In addition to the A-component and B-component as described hereinabove, the formulation of the present invention may include further additives or modifiers such as are well-known in the art. For example, surfactants, catalysts, flame retardants, and/or fillers may be employed. Exemplary thereof are, in particular, one or more trimerization catalysts. The trimerization catalyst employed may be any known to those skilled in the art that will catalyze the trimerization of an organic isocyanate compound to form the isocyanurate moiety. For typical isocyanate trimerization catalysts, see *The Journal of Cellular Plastics*, November/December 1975, page 329: and U.S. Pat. Nos. 3,745,133; 3,896,052; 3,899,443; 3,903,018; 3,954,684 and 4,101,465; the disclosures of which are incorporated by reference herein in their entireties. Typical trimerization catalysts include the glycine salts, tertiary amine trimerization catalysts, alkali metal carboxylic acid salts, and mixtures of these classes of catalysts. Preferred species within the classes are sodium N-2-hydroxy-5-nonylphenyl-methyl-N-methylglycinate, N,N-dimethylcyclohexyl-amine, and mixtures thereof. Also included in the preferred catalyst components are the epoxides disclosed in U.S. Pat. No. 3,745,133, the disclosure of which is incorporated herein by reference in its entirety.

Another category of catalysts that may be included is the amine catalysts, including any organic compound which contains at least one tertiary nitrogen atom and is capable of catalyzing the hydroxyl/isocyanate reaction between the A-component and B-component. Typical classes of amines include the N-alkylmorpholines, N-alkyl-alkanolamines, N,N-dialkylcyclohexylamines, and alkylamines where the alkyl groups are methyl, ethyl, propyl, butyl and isomeric forms thereof, and heterocyclic amines. Typical but non-limiting thereof are triethylenediamine, tetramethylethylenediamine, bis(2-dimethylaminoethyl)ether, triethylamine, tripropylamine, tributylamine, triamylamine, pyridine, quinoline, dimethylpiperazine, piperazine, N,N-dimethylcyclohexylamine, N-ethyl-morpholine, 2-methylpropanediamine, methyltriethylenediamine, 2,4,6-tridimethylaminomethyl)phenol, N,N',N"-tris(dimethylaminopropyl)symhexahydrotriazine, and mixtures thereof. A preferred group of tertiary amines from which selection may be made comprises bis(2-dimethylamino-ethyl)ether, dimethylcyclohexylamine, N,N-dimethyl-ethanolamine, triethylenediamine, triethylamine, 2,4,6-tri(dimethylaminomethyl)phenol, N,N',N-ethylmorpholine, and mixtures thereof.

Non-amine catalyst may also be used in the present invention. Typical of such catalysts are organometallic compounds of bismuth, lead, tin, titanium, iron, antimony, uranium, cadmium, cobalt, thorium, aluminum, mercury, zinc, nickel, cerium, molybdenum, vanadium, copper, manganese, zirconium, and combinations thereof. Included for illustrative purposes only are bismuth nitrate, lead 2-ethylhexoate, lead benzoate, lead naphthenate, ferric chloride, antimony trichloride, antimony glycolate, combinations thereof, and the like. A preferred class includes the stannous salts of carboxylic acids, such as stannous acetate, stannous octoate, stannous 2-ethylhexoate, 1-methylimidazole, and stannous laurate, as well as the dialkyl tin salts of carboxylic acids, such as dibutyl tin diacetate, dibutyl tin dilaurate, dibutyl tin dimaleate, dioctyl tin diacetate, combinations thereof, and the like.

Catalysts, such as NIAX* A-1, POLYCAT* 9 and/or POLYCAT* 77, may be included in amounts from about 1 to about 8 parts, total, of B-component. (NIAX* A-1 is available from General Electric. POLYCAT* 9 and POLYCAT* 77 are available from Air Products.) Additional catalysts, such as TOYOCAT* DM 70 or other gelling catalysts, may be included in amounts ranging from 0 to about 2 parts. (TOYOCAT* DM 70 is available from Tosoh Corporation.)

Other additives useful with the present invention are one or more brominated or non-brominated flame retardants, such as tris(2-chloroethyl)phosphate, tris(2-chloropropyl)phosphate, tris(1,3-dichloropropyl)phosphate, diammonium phosphate, various halogenated aromatic compounds, antimony oxide, alumina trihydrate, polyvinyl chloride, and combinations thereof. Dispersing agents, cell stabilizers, and surfactants may also be incorporated into the formulations. Surfactants, including organic surfactants and silicone based surfactants, may be added to serve as cell stabilizers. Some representative materials are sold under the designations SF-1109, L-520, L-521 and DC-193, which are, generally, polysiloxane polyoxyalkylene block copolymers, such as those disclosed in U.S. Pat. Nos. 2,834,748; 2,917,480; and 2,846,458, the disclosures of which are incorporated herein by reference in their entireties. Also included are organic surfactants containing polyoxyethylene-polyoxybutylene block copolymers, as are described in U.S. Pat. No. 5,600,019, the disclosure of which is incorporated herein by reference in its entirety. It is particularly desirable to employ a minor amount of a surfactant to stabilize the foaming reaction mixture until it cures. Other surfactants include polyethylene glycol ethers of long-chain alcohols, tertiary amine or alkanolamine salts of long-chain allyl acid sulfate esters, alkylsulfonic esters, alkyl arylsulfonic acids, and combinations thereof. Such surfactants are employed in amounts sufficient to stabilize the foaming reaction against collapse and the formation of large uneven cells. Typically, from about 0.2 to about 3 parts of the surfactant per 100 parts by weight of the polyol composition are sufficient for this purpose. Surfactants, such as DABCO* DC-5598, may be included in any amount ranging from 0 to about 6 parts. (DABCO* DC-5598 is available from Air Products) Other additives such as carbon black and colorants may be added. Finally, fillers and pigments such as barium sulfate, calcium carbonate, graphite, carbon black, titanium dioxide, iron oxide, microspheres, alumina trihydrate, wollastonite, prepared glass fibers (dropped or continuous), and polyester fibers and other polymeric fibers, may be included.

Foam Preparation

The polyisocyanurate polymer prepared according to the process of this invention is a rigid, foamed, closed-cell polymer. Such a polymer is typically prepared by intimately mixing the reaction components, i.e., a polyol component (consisting essentially of or comprising the polyol/blowing agent composition defined hereinabove), along with an isocyanate component, i.e., two streams; or a separate polyol component (consisting essentially of or comprising the polyol composition defined hereinabove), blowing agent component, and isocyanate component, i.e., three streams, with the polyol component and blowing agent component mixing just prior to contact thereof with the isocyanate component) at room temperature or a slightly elevated temperature for a short period. This mixing may be carried out either in a spray apparatus, a mixhead with or without a static mixer for combining the polyol component and blowing agent, or a vessel, and then spraying or otherwise depositing the reacting mixture onto a substrate. This substrate may be, for example, a rigid or flexible facing sheet made of foil or another material which is being conveyed along a production line.

In alternative embodiments the reacting mixture may be poured into an open mold or distributed via laydown equipment into an open mold or simply deposited at or into a location for which it is destined, i.e., a pour-in-place application, such as between the interior and exterior walls of a structure. In the case of deposition on a facing sheet, a second sheet may be applied on top of the deposited mixture. In other embodiments, the mixture may be injected into a closed mold, with or without vacuum assistance for cavity-filling. If a mold is employed, it is most typically heated.

In general, such applications may be accomplished using the known one-shot, prepolymer or semi-prepolymer techniques used together with conventional mixing methods. The mixture, on reacting, takes the shape of the mold or adheres to the substrate to produce a polyisocyanurate polymer of a more-or-less predefined structure, which is then allowed to cure in place or in the mold, either partially or fully. Suitable conditions for promoting the curing of the polymer include a temperature of typically from 20° C. to 150° C., preferably from 35° C. to 75° C., and more preferably from 45° C. to 55° C. Such temperatures will usually permit the sufficiently cured polymer to be removed from the mold, where such is used, typically within from 1 to 10 minutes and more typically within from 1 to 5 minutes after mixing of the reactants. Optimum cure conditions will depend upon the particular components, including catalysts and quantities used in preparing the polymer and also the size and shape of the article manufactured.

The result may be a rigid foam in the form of slabstock, a molding, a filled cavity, including but not limited to a pipe or insulated wall or hull structure, a sprayed foam, a frothed foam, or a continuously- or discontinuously-manufactured laminated product, including but not limited to a laminated product formed with other materials, such as hardboard, plasterboard, plastics, paper or metal. Advantageously, the polyisocyanurate foams prepared in the present invention may show improved cohesion and adhesion and a reduced incidence of voids when applied directly to a metal substrate, such as a foil backing such as is used for insulation structures.

The description hereinabove is intended to be general and is not intended to be inclusive of all possible embodiments of the invention. Similarly, the examples herein-below are provided to be illustrative only and are not intended to define or limit the invention in any way. Those skilled in the art will be fully aware that other embodiments, within the scope of the claims, will be apparent, from consideration of the specification and/or practice of the invention as disclosed herein. Such other embodiments may include selections of specific components and proportions thereof; mixing and reaction conditions, vessels, deployment apparatuses, and protocols; performance and selectivity; identification of products and by-products; subsequent processing and use thereof; and the like; and those skilled in the art will recognize that such may be varied within the scope of the claims appended hereto.

EXAMPLES

The materials used in the examples are as follows:

TERATE* 2541V is an aromatic polyester polyol, available from Invista.

VORALAST* GF422 is an aliphatic polyester polyol prepared from the reaction of adipic acid, ethylene glycol and diethylene glycol, having a hydroxyl number of 56, available from The Dow Chemical Company.

IP* 585 is Polyol IP 585, an aromatic resin-initiated oxypropylene-oxyethylene polyol with hydroxyl number of 195 and average functionality of 3.3, available from The Dow Chemical Company.

TERCAROL* 5902 is a TDA initiated, oxypropylene oxyethylene polyol, available from The Dow Chemical Company.

TCPP is tris(chloroisopropyl) phosphate.

DEEP is diethyl ethylphosphonate.

CURITHANE* 206 is a catalyst available from The Dow Chemical Company.

DMCHA is dimethylcyclohexylamine.

DC* 5598 is DABCO DC 5598, a surfactant available from Air Products.

Formic acid is a 98 percent purity product that serves as a chemical blowing agent.

HFC-245fa is 1,1,1,3,3-pentafluoropropane, a hydrofluorocarbon blowing agent.

Examples 1 and 2

Two B-component blends are prepared and their stability evaluated. Their components and performance are shown in Table 1.

TABLE 1

| Component | Example 1 | Example 2 |
|---|---|---|
| TERATE* 2541V | 26 | 21 |
| VORALAST* GF422 | 11 | 16 |
| IP* 585 | 26.75 | 26.75 |
| TERCAROL* 5902 | — | — |
| TCPP | 12.8 | 12.8 |
| DEEP | 5 | 5 |
| CURITHANE* 206 | 2.2 | 2.2 |
| DMCHA | 0.05 | 0.05 |
| DC* 5598 | 3 | 3 |
| Water | 1.3 | 1.3 |
| Formic Acid | 1.9 | 1.9 |
| HFC-245fa | 10 | 10 |
| Total | 100 | 100 |
| Blend aspect | Clear | Clear |
| Phase separation | None, stable 60 days | None, stable 60 days |

Comparative Examples 1-4

Four additional B-component blends are prepared, for purposes of comparing with Examples 1 and 2. The components of these blends and their stability evaluation are shown in Table 2. Blending procedures are identical with those of Examples 1 and 2.

TABLE 2

| Component | Comp. Ex. 1 | Comp. Ex. 2 | Comp. Ex. 3 | Comp. Ex. 4 |
|---|---|---|---|---|
| TERATE* 2541V | — | — | 5 | 11 |
| VORALAST* GF422 | 37 | 37 | 32 | 26 |
| IP* 585 | 26.75 | — | 26.75 | 26.75 |
| TERCAROL* 5902 | — | 26.75 | — | — |
| TCPP | 12.8 | 12.8 | 12.8 | 12.8 |
| DEEP | 5 | 5 | 5 | 5 |
| CURITHANE* 206 | 2.2 | 2.2 | 2.2 | 2.2 |
| DMCHA | 0.05 | 0.05 | 0.05 | 0.05 |
| DC* 5598 | 3 | 3 | 3 | 3 |
| Water | 1.3 | 1.3 | 1.3 | 1.3 |

TABLE 2-continued

| Component | Comp. Ex. 1 | Comp. Ex. 2 | Comp. Ex. 3 | Comp. Ex. 4 |
|---|---|---|---|---|
| Formic Acid | 0.05 | 0.05 | 0.05 | 0.05 |
| HFC-245fa | 10 | 10 | 10 | 10 |
| Total | 98.15 | 98.15 | 98.15 | 98.15 |
| Blend aspect | Hazy | Hazy | Hazy | Hazy |
| Phase separation | Yes, after 1 week | Yes, after 1 week | Yes, after 1 week | Yes, after 1 week |

Example 3 and Comparative Examples 5-7

A series of polyisocyanurate foam panels are prepared on steel substrates placed in a closed mold using the components and proportions shown in Table 3, and otherwise using identical preparation methods and procedures. One panel is an example of the invention (Example 3) and three are comparatives (Comparative Examples 5-7). They are then evaluated in Brett molds and jumbo molds. Heat release is measured via calorimetry using a cone calorimeter, according to the procedure of ISO 5660, and for tensile bond strength, according to EN 14509. These results are also shown in Table 3.

TABLE 3

| COMPONENTS and FORMULATION | Example 3 | Comp. Ex. 5 | Comp. Ex. 6 | Comp. Ex. 7 |
|---|---|---|---|---|
| IP* 585 | 26.75 | 16.9 | 27 | 27 |
| TERATE* 4026 | — | 27.75 | — | — |
| TERATE* 7541 | 26.1 | — | — | — |
| TERATE* 7541L | — | — | 31.4 | 31.4 |
| VORALAST* GF422 | 11 | — | — | — |
| CP* 1421 | — | — | 8 | 8 |
| TCPP | 12.8 | 29.5 | 10.6 | 10.6 |
| DEEP | 5 | 8 | 5 | 5 |
| DMCHA | 0.05 | — | — | — |
| CURITHANE* 206 | 2 | 1.75 | 2 | 2.2 |
| DC* 5598 | 3 | 3 | 3 | 3 |
| Water | 1.3 | — | — | 2.3 |
| Formic Acid | 2 | 3.1 | 3 | 0.5 |
| HFC-245fa | 10 | 10 | 10 | 10 |
| Total | 100 | 100 | 100 | 100 |
| ISO (Voranate M220)/Polyol | 185/100 | 144/100 | 151/100 | 198/100 |
| Index | 2.9 | 3.25 | 3.05 | 2.84 |
| Reactivity, Cream Time/Gel Time (sec) | 8/102 | 5/88 | 4/76 | 10/90 |
| Free Rise Density (kg/m$^3$) | 34.8 | 34.6 | 33.45 | 34.2 |
| BRETT MOLD | | | | |
| Minimum Fill Density (kg/m$^3$) | 49.2 | 45.3 | 47.2 | 50.4 |
| Flow Index | 1.41 | 1.309 | 1.41 | 1.475 |
| Average Density Distribution (foam overpacking: 10%) | 0.497 | 0.87 | 0.443 | 0.4 |
| Compressive Strength (kPa) | 288 | 202 | 299 | 303 |
| Thermal Conductivity at 10° C. (mW/m °K) | 21.6 | not detected | 21.51 | 21.57 |
| JUMBO MOLD (40x70x10 cm) at 50° C. | | | | |
| Molded Density (g/L) | 54.9 | 47.8 | 51.9 | 55.8 |
| UNI8069, Dimensional Stability at −25° C., 48 h, linear variation (%) | | | | |
| Length | 0 | −0.03 | −0.02 | −0.01 |
| Width | 0 | −0.13 | −0.03 | −0.06 |
| Thickness | 0.11 | −0.17 | 0 | −0.04 |
| Dimensional Stability at +80° C., 48 h, linear variation (%) | | | | |
| Length | −0.44 | −0.85 | −0.51 | −0.4 |
| Width | −0.48 | −0.84 | −0.52 | −0.37 |
| Thickness | 0 | −0.41 | −0.27 | −0.22 |

TABLE 3-continued

| COMPONENTS and FORMULATION | Example 3 | Comp. Ex. 5 | Comp. Ex. 6 | Comp. Ex. 7 |
|---|---|---|---|---|
| CALORIMETER (Total HR, RHR, smoke) ISO 5660 | | | | |
| Rate heat release, max (kW/m2) | 74 | 81 | 96 | 95 |
| Total heat released (at 500 sec) (kW) | 5429 | 9000 | 13783 | 12904 |
| Total smoke/smoke peak (transmittance) | 18681/46 | 18501/41 | 18332/39 | 18434/40 |
| TRIMER CONTENT | | | | |
| Relative %, foam core measure | 49 | 62 | 57 | 52 |
| TENSILE BOND STRENGTH* (EN 14509) | | | | |
| Specimen cut from (2x1x0.1) mt panel (kPa) | 145 | 88.4 | 103.1 | 70.5 |

*Reported tensile bond strength data are calculated as average value. Those with cohesive failure mechanism are higher in the case of Example 3 than in comparative examples.

In general, Example 3 shows better cone calorimetry properties, with a reduced peak of heat release and reduced total heat release. Improved tensile bond strength properties may also be seen in Example 3.

What is claimed is:

1. A storage-stable polyol composition consisting essentially of
   (a) from about 1 to about 20 percent by weight of an aliphatic polyester polyol having a hydroxyl number of less than about 100, wherein the aliphatic polyester polyol is prepared by the reaction of at least a polycarboxylic acid, or an anhydride of the polycaroxylic acid, with a polyhydroxy compound;
   (b) from about 1 to about 60 percent by weight of an aromatic polyester polyol;
   (c) from about 1 to about 60 percent by weight of a Novolac-type polyether polyol; and
   (d) from about 1 to about 20 percent by weight of a hydrofluorocarbon blowing agent;
   wherein the weight percent ratio of aromatic polyester polyol to aliphatic polyester polyol is from about 80:20 to about 30:70 and the polyol composition does not exhibit phase separation, as determined by unenhanced visual inspection, for a period of at least 60 days under ambient conditions.

2. The polyol composition of claim 1 wherein the polycarboxylic acid or the anhydride of the polycarboxylic acid is selected from the group consisting of adipic acid, glutaric acid, succinic acid, pimelic acid, suberic acid, azelaic acid, sebacic acid, undecanedioic, dodecanedioic, hexanedioic acid, hexahydrophthalic acid, 1,3- and 1,4-cyclohexane dicarboxylic acid, fumaric acid, maleic acid, maleic anhydride, phthalic anhydride, and combinations thereof.

3. The polyol composition of claim 1 wherein the polyhydroxy compound is prepared from the group consisting of lower alkylene and lower alkoxyalkylene compounds having from 2 to 12 carbon atoms.

4. The polyol composition of claim 1 wherein the polyhydroxy compound is selected from the group consisting of ethylene glycol, diethylene glycol, propylene glycol, dipropylene glycol, 1,2- and 1,3-propanediol, 1,10-decanediol, glycerine, trimethylolpropane, 1,4-butanediol, 1,5-pentanediol, 1,6-hexanediol and 1,3- and 1,4-cyclohexanedimethanol, ethanediol, tripropylene glycol, tetraethylene glycol, tetrapropylene glycol, tetramethylene glycol, and combinations thereof.

5. The polyol composition of claim 1 wherein the aliphatic polyester polyol is prepared by the reaction of a dimer fatty acid, or fatty acid ester thereof; a non-dimer polycarboxylic acid; and a polyhydroxy compound.

6. The polyol composition of claim 5 wherein the dimer fatty acid is a dimerization product of oleic acid, linoleic acid, linolenic acid, palmitoleic acid, elaidic acid or an unsaturated mixture of natural fats and oils obtained by hydrolysis of sunflower oil, soybean oil, olive oil, rapeseed oil, cottonseed oil, or tall oil.

7. The polyol composition of claim 1 wherein the polycarboxylic acid is adipic acid and the polyhydroxy compound is ethylene glycol or diethylene glycol.

8. The polyol composition of claim 1 wherein the aliphatic polyester polyol is selected from the group consisting of cycloaliphatic and heterocyclic aliphatic polyester polyols and aliphatic polyester polyols of lactones.

9. The polyol composition of claim 8 wherein the aliphatic polyester polyols of lactones are selected from the group consisting of epsilon-caprolactones, hydroxycarboxylic acids, and combinations thereof.

10. The polyol composition of claim 1 wherein the aromatic polyester polyol is selected from the group consisting of aromatic polyester polyols having at least about 50 weight percent aromatic content.

11. The polyol composition of claim 10 wherein the aromatic polyester polyol has from about 70 to about 90 weight percent aromatic content.

12. The polyol composition of claim 1 wherein the aromatic polyester polyol is obtained by the transesterification of crude reaction residues or scrap polyester resins.

13. The polyol composition of claim 1 wherein the Novolac-type polyether polyol is prepared from a phenol selected from the group consisting of o-, m-, and p-cresols, ethylphenol, nonylphenol, p-phenylphenol, 2,2-bis(4-hydroxyphenol) propane, beta-naphthol, beta-hydroxyanthracene, p-chlorophenol, o-bromophenol, 2,6-dichloro-phenol, p-nitrophenol, 4-nitro-6-phenylphenol, 2-nitro-4-methylphenol, 3,5-dimethylphenol, p-isopropylphenol, 2-bromo-4-cyclohexylphenol, 4-t-butylphenol, 2-methyl-4-bromophenol, 2-(2-hydroxypropyl)phenol, 2-(4-hydroxyphenol) ethanol, 2-carbethoxyphenol, 4-chloro-methylphenol, and mixtures thereof.

14. The polyol composition of claim 1 wherein the aromatic polyester polyol is present in an amount from about 1 to 50 percent by weight; and the Novolac-type polyether polyol is present in an amount from about 20 to about 50 percent by weight; based on the polyol composition.

15. The polyol composition of claim 1 further comprising a hydrocarbon or non-fluorine-containing hydrohalocarbon blowing agent.

16. The polyol composition of claim 1 wherein the polyol composition comprises at least one compound is selected from the group consisting of HCFC-142b (1-chloro-1,1-difluoroethane), HCFC-22 (chloro-difluoromethane), HFC-245fa (1,1,1,3,3-pentafluoropropane), HCFC-365mfc (1,1,1,3,3-pentafluorobutane), HFC-227ea (1,1,1,2,3,3,3-heptafluoropropane), HFC-134a (1,1,1,2-tetrafluoroethane), butane, isobutane, 2,3-dimethylbutane, n- and i-pentane isomers, hexane isomers, heptane isomers, cyclopentane, cyclohexane, cycloheptane, and combinations thereof.

17. The polyol composition of claim 1 wherein the hydrofluorocarbon blowing agent is present in an amount of from about 2 to about 15 parts per 100 parts by weight of the polyol composition.

18. A formulation for preparing a polyisocyanurate foam comprising
a polyisocyanate; and
a polyol composition comprising
   (a) from about 1 to about 20 percent by weight of an aliphatic polyester polyol having a hydroxyl number of less than about 100, wherein the aliphatic polyester polyol is prepared by the reaction of at least a polycarboxylic acid with a polyhydroxy compound;
   (b) from about 1 to about 60 percent by weight of an aromatic polyester polyol;
   (c) from about 1 to about 60 percent by weight of a Novolac-type polyether polyol; and
   (d) from about 1 to about 20 percent by weight of a hydrofluorocarbon blowing agent;
the polyol composition being such that it does not exhibit phase separation, as determined by unenhanced visual inspection, for a period of at least 60 days under ambient conditions.

19. A method of preparing a polyisocyanurate foam comprising contacting under foam-forming conditions
a polyisocyanate; and
a polyol composition comprising
   (a) from about 1 to about 20 percent by weight of an aliphatic polyester polyol having a hydroxyl number of less than about 100, wherein the aliphatic polyester polyol is prepared by the reaction of at least a polycarboxylic acid with a polyhydroxy compound;
   (b) from about 1 to about 60 percent by weight of an aromatic polyester polyol;
   (c) from about 1 to about 60 percent by weight of a Novolac-type polyether polyol; the polyol composition being such that it does not exhibit phase separation, as determined by unenhanced visual inspection, for a period of at least 60 days under ambient conditions; and
   (d) from about 1 to about 20 percent by weight of a hydrofluorocarbon blowing agent;
wherein the weight percent ratio of aromatic polyester polyol(s) to aliphatic polyester polyol(s) is from about 80:20 to about 30:70, the polyol composition being such that it does not exhibit phase separation, as determined by unenhanced visual inspection, for a period of at least 60 days under ambient conditions;
at an isocyanate index ranging from about 2.5 to about 4; to form a rigid polyisocyanurate foam.

* * * * *